United States Patent
Cho et al.

(10) Patent No.: US 9,185,681 B2
(45) Date of Patent: Nov. 10, 2015

(54) METHOD AND APPARATUS FOR TRANSMITTING PAGING MESSAGE IN WIRELESS COMMUNICATION SYSTEM

(71) Applicant: LG ELECTRONICS INC., Seoul (KR)

(72) Inventors: Heejong Cho, Seoul (KR); Hyeyoung Choi, Seoul (KR); Eunjong Lee, Seoul (KR); Jaehoon Chung, Seoul (KR); Geenbeck Hahn, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 14/510,865

(22) Filed: Oct. 9, 2014

(65) Prior Publication Data
US 2015/0126235 A1    May 7, 2015

(30) Foreign Application Priority Data
Nov. 5, 2013 (KR) .................. 10-2013-0133643

(51) Int. Cl.
*H04W 68/00* (2009.01)

(52) U.S. Cl.
CPC .................. *H04W 68/005* (2013.01)

(58) Field of Classification Search
CPC .................................................. H04W 68/005
See application file for complete search history.

(56) References Cited

U.S. PATENT DOCUMENTS

| | | | | |
|---|---|---|---|---|
| 2010/0329213 A1* | 12/2010 | Hayashi | ............... | H04W 24/02 370/331 |
| 2012/0300710 A1* | 11/2012 | Li | ............... | H04W 88/085 370/329 |
| 2013/0243075 A1* | 9/2013 | Dalela | ............... | H04L 65/80 375/240.01 |
| 2013/0252649 A1* | 9/2013 | Siomina | ............... | H04W 4/02 455/466 |
| 2013/0322581 A1* | 12/2013 | Piirainen | ............... | H04L 7/042 375/343 |
| 2014/0233479 A1* | 8/2014 | Dahod | ............... | H04W 72/044 370/329 |
| 2014/0241315 A1* | 8/2014 | Niu | ............... | H04L 67/1091 370/331 |
| 2014/0255034 A1* | 9/2014 | Huo | ............... | H04Q 11/0067 398/82 |
| 2014/0286258 A1* | 9/2014 | Chowdhury | ............... | H04L 1/1812 370/329 |
| 2014/0328204 A1* | 11/2014 | Klotsche | ............... | H04L 43/028 370/252 |
| 2014/0335859 A1* | 11/2014 | Hahn | ............... | H04W 76/04 455/435.1 |
| 2015/0036664 A1* | 2/2015 | Yuk | ............... | H04W 36/30 370/332 |
| 2015/0087324 A1* | 3/2015 | Ishida | ............... | H04W 16/00 455/452.2 |

* cited by examiner

*Primary Examiner* — Erin File
(74) *Attorney, Agent, or Firm* — Dentons US LLP

(57) ABSTRACT

A method and apparatus for transmitting a paging message in a cloud radio access network (RAN) system is provided. A baseband unit (BBU) or a mobility management entity (MME) determines a location update range of a user equipment (UE) based on moving speed and a moving direction of the UE, and transmits information this to the UE. The UE transmits information on moving information of the UE, which is determined based on the received information and a measurement result with respect to at least one accessible remote radio frequency (RF) unit (RRU) of the UE, and the measurement result to the BBU or the MME; and The BBU or MME updates the location update range of the UE based on the received measurement result and the moving information of the UE, and transmits a paging message to the UE through at least one RRU included in the updated location update range of the UE.

14 Claims, 10 Drawing Sheets

METHOD AND APPARATUS FOR TRANSMITTING PAGING MESSAGE IN WIRELESS COMMUNICATION SYSTEM

CROSS-REFERENCE TO RELATED APPLICATIONS

This application claims the benefit of priority of Korean Patent application No. 10-2013-0133643 filed on Nov. 5, 2013, which is incorporated by reference in its entirety herein.

BACKGROUND OF THE INVENTION

1. Field of the Invention

The present invention relates to wireless communications, and more particularly, to a method and apparatus for transmitting a paging message in a wireless communication system.

2. Related Art

A universal mobile telecommunications system (UMTS) is a third ($3^{rd}$) generation asynchronous mobile communication system which is operated at wideband code division multiple access (WCDMA) based on European system such as global system for mobile communications (GSM) and general packet radio services (GPRS). Long-term evolution (LTE) and LTE-advanced (LTE-A) have been discussed as 4th generation mobile communication system by 3rd generation partnership project (3GPP) standardizing UMTS. 3GPP LTE and 3GPP LTE-A is technology for high speed packet communication. The 3GPP LTE requires cost reduction of a user and improvement of a service quality, extended and improved coverage and system capacity, flexible use of a frequency band, a simple structure, open interface and suitable power use of UE. To this end, various schemes have been suggested.

Further, it is expected that a request for data traffic is increased due to increase in image service and an ultra-high speed data service. Accordingly, as a solution scheme, there is a need for a scheme which may improve a whole efficiency and performance in all parts of the 4th mobile generation mobile communication system and additionally allocate a new frequency band. Accordingly, discussion for a 5th generation mobile communication system being a next generation mobile communication system starts.

Meanwhile, in the 4th generation mobile communication system and the 5th mobile communication system, various types of small cells such as a pico cell or a femto cell cooperate with a macro cell so that a radio access network (RAN) structure is changed. The 4th generation mobile communication system or the 5th mobile communication system is aimed at increasing quality of experience (QoE) by providing a high data transmission rate to a final user in a state that vertical multiple layer cells controlled by an existing macro cell coexist. The small cell is aimed at increasing spectrum efficiency by efficient deployment and operation. Ideal or non-ideal backhaul network may be supported between the macro cell and the small cell, and/or between small cells. The small cell may be provided in a sparse deployment environment and/or a dense deployment environment. In the next generation mobile communication system, construction of a small cell, to support increase in data traffic in a dense zone and indoor, may be significantly increased. Further, since researches for optimizing performance of small cells have been developed, the cells have a possibility to be developed to an operating system independently from the macro cell.

In recent years, discussion to improve indoor/outdoor scenarios using low power nodes has been performed. That is, research to provide a wireless communication service indoor/outdoor through a macro cell based on high-power node and a small cell based on a low-power node has been performed. Further, a work for obtaining advantages with respect to dual connectivity concept having a simultaneous connectivity in a macro cell layer and a small cell layer using the same or different carrier has been discussed. When considering such a trend, as a great number of small cells are deployed, it is expected that final users are physically located closer to a network.

Accordingly, in a radio access network of a 5th generation mobile communication system, it is expected that communication through user-centered virtual coverage other than existing physical cell based communication is achieved. In order to allow communication through the user-centered virtual coverage, a service provision unit such as user-centered virtual coverage distinguished from the existing cell based service provision unit should be implemented. This may cause a serious influence on a current wireless access network. For example, in a case of providing the user-centered virtual coverage, there may be a need for a new method of updating a tracking area and a new method of transmitting a paging message other than an existing method of updating a tracking area and an existing method of transmitting a paging message.

SUMMARY OF THE INVENTION

The present invention provides a method and apparatus for transmitting a paging message in a wireless communication system. The present invention further provides a method for transmitting a paging message according to trace of a user equipment (UE) in a cloud radio access network (RAN). The present invention further provides a method for determining a range to perform a location updating procedure according to trace of the UE and performing a location update procedure in a cloud RAN environment.

In an aspect, a method for receiving, by user equipment (UE), a paging message in a cloud radio access network (RAN) system is provided. The method includes receiving information on a location update range of a UE, which is determined based on moving speed and a moving direction of the UE, from a baseband unit (BBU) or a mobility management entity (MME), transmitting information on moving information of the UE, which is determined based on the received information on the location update range and a measurement result with respect to at least one accessible remote radio frequency (RF) unit (RRU) of the UE, and the measurement result to the BBU or the MME, and receiving a paging message from the MME through at least one RRU included in an updated location update range, which is determined based on the transmitted measurement result and the moving information of the UE. The cloud RAN system comprises at least one virtual BBU pool. The at least one virtual BBU pool includes a plurality of BBUs to perform hierarchical process and a plurality of RRUs to transmit or receive a radio signal. One RRUs is mapped to at least one BBU through an access gateway and is controlled by the at least one BBU.

In another aspect, a method for transmitting, by a baseband unit (BBU) or a mobility management entity (MME), a paging message in a cloud radio access network (RAN) system is provided. The method includes determining a location update range of a user equipment (UE) based on moving speed and a moving direction of the UE, transmitting information on the location update range of the UE to the UE, receiving information on moving information of the UE, which is determined by the UE based on the transmitted information on the location update range and a measurement result with respect to at least one accessible remote radio frequency (RF) unit (RRU) of the UE, and the measurement result from the UE, updating the location update range of the UE based on the received measurement result and the moving information of the UE, and transmitting a paging message to the UE through at least one RRU included in the updated location update range of the UE. The cloud RAN system comprises at least one virtual BBU pool. The at least one virtual BBU pool includes a plurality of BBUs to perform hierarchical process and a plurality of RRUs to transmit or receive a radio signal. One RRUs is mapped to at least one BBU through an access gateway and is controlled by the at least one BBU.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802-20, evolved UTRA (E-UTRA), etc. IEEE 802.16m is an evolution of IEEE 802.16e, and provides backward compatibility with an IEEE 802.16-based system. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in downlink and uses the SC-FDMA in uplink. LTE-advance (LTE-A) is an evolution of the 3GPP LTE.

For clarity, the following description will focus on the LTE-A. However, technical features of the present invention are not limited thereto.

Figure 1:
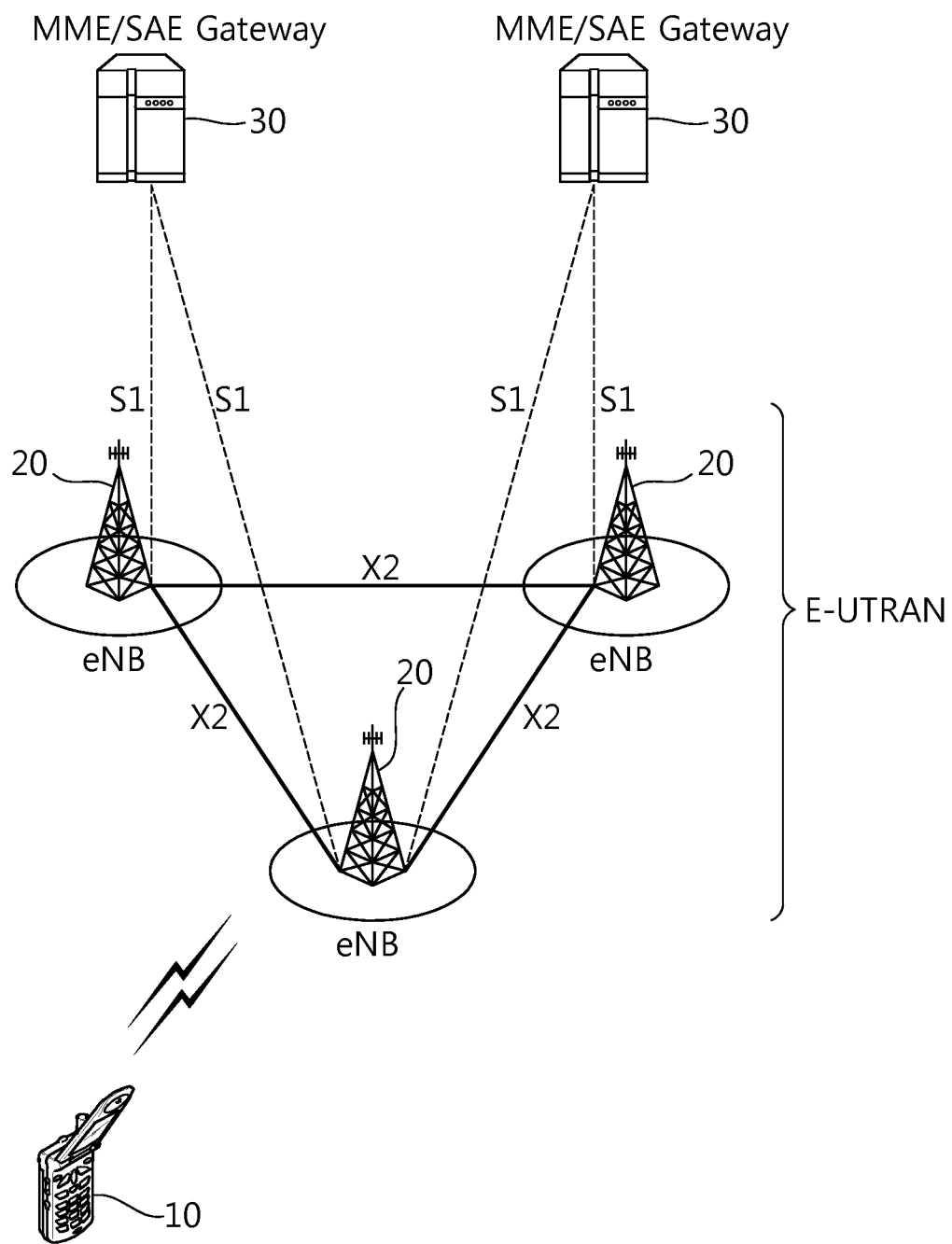
FIG. 1 shows LTE system architecture.

FIG. 1 shows LTE system architecture.

The LTE system architecture includes a user equipment (UE) 10, an evolved-TUMS terrestrial radio access network (E-UTRAN), and an evolved pack core (EPC). The UE 10 may be fixed or may have mobility. The UE may refer to other terms such as a mobile station (MS), a user terminal (UT), a subscriber station (SS), a mobile terminal (MT), or wireless device. The E-UTRAN includes a plurality of eNodeBs (eNBs) 20. The eNBs 20 provide a control plane and a user plane to the UE 10. The eNB 20 means a fixed station to communicate with the UE 10. The eNB 20 may refer to a other terms such as a base station (BS), a base transceiver system (BTS), or an access point. At least one cell may exist in one eNB 20. One of bandwidths having 1.25, 2.5, 5, 10, 20 MHz is set to one cell so that uplink or downlink transmission service is provided to a plurality of UEs. In this case, it may be set that different bandwidths are provided to different cells.

EPC includes a mobility management entity (MME), in charge of a control plane function, and a serving gateway (S-GW), in charge of a user plane function. The EPC may further include a packet date network (PDN) gateway (P-GW). The MME includes UE access information or UE capability information, and such information may be mainly used to manage mobility of the UE. The S-GW is a gateway having E-UTRAN as an end point. The P-GW is a gateway having a PDN as an end point.

Interface to transmit user traffic or control traffic may be used. The UE 10 is connected to the eNB 20 through Uu interface. The eNBs 20 are connected to each other through X2 interface. The eNB 20 is connected to the EPC through S1 interface. The eNB 20 is connected to the MME through S1-MME interface. The eNB 20 is connected to the S-GW through S1-U interface. The S1 interface supports many-to-many-relation between the eNB 20 and an MME/S-GW.

Hereinafter, downlink (DL) means communication from the eNB 20 to the UE 10. Uplink (UL) means communication from the UE 10 to the eNB 20. In the DL, a transmitter may be a part of the eNB 20 and a receiver may be a part of the UE 10. In the UL, the transmitter may be a part of the UE 10 and the receiver may be a part of the eNB 20.

Figure 2:
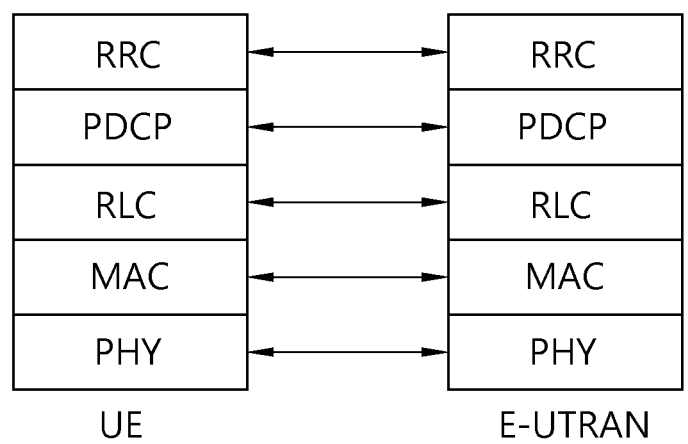
FIG. 2 shows a control plane of a radio interface protocol of an LTE system.
Figure 3:
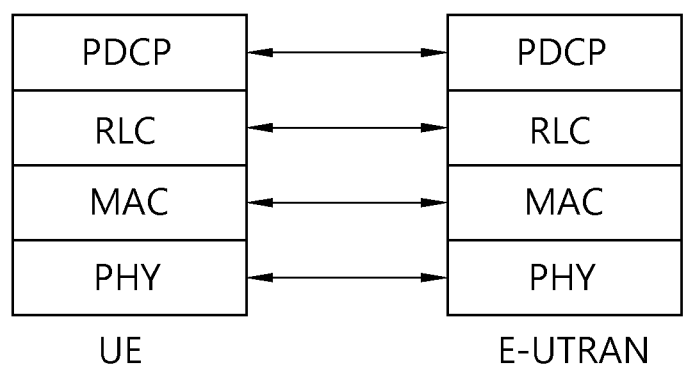
FIG. 3 shows a user plane of a radio interface protocol of an LTE system.

FIG. 2 shows a control plane of a radio interface protocol of an LTE system. FIG. 3 shows a user plane of a radio interface protocol of an LTE system.

Layers of a radio interface protocol between the UE and the E-UTRAN may be classified into a first layer L1, a second layer L2, and a third layer L3 based on three lower layers of an open system interconnection (OSI) reference model which is widely known in a communication system. A radio interface protocol between the UE and the E-UTRAN may be horizontally classified into a physical layer, a data link layer, and a network layer. The radio interface protocol between the UE and the E-UTRAN may be vertically classified into a control plane being a protocol stack to transmit a control signal and a user plane being a protocol stack to transmit data information. Layers of the radio interface protocol exist as a pair in the UE and the E-UTRAN, and are in charge of transmission of data of the Uu interface.

A physical layer (PHY) belongs to the L1. The PHY provides an information transmission service to an upper layer through a physical channel. The PHY is connected to a medium access control (MAC) layer being an upper layer through a transport channel. Data is transmitted between an MAC layer and the PHY through the transport channel. The transport channel is divided into a dedicated transport channel and a common transport channel according to presence of sharing of a channel. The data is transmitted between different PHYs, that is, PHYs of a transmitter and a receiver, through the physical channel using radio resources. The PHY is modulated using an orthogonal frequency division multiplexing OFDM) scheme, and uses a time and a frequency as radio resources.

Several physical control channels may be used for the PHY. A physical downlink control channel (PDCCH) allocates resources of a paging channel (PCH) and a downlink shared channel (DL-SCH) to the UE and reports hybrid automatic repeat request (HARQ) information associated with the DL-SCH to the UE. The PDCCH may carry an UL grant to report resource allocation of UL transmission to the UE. A physical control format indicator channel (PCFICH) reports the number of OFDM symbols used for the PDCCHs, and is transmitted for each subframe. A physical hybrid ARQ indicator channel (PHICH) carries HARQ acknowledgement/non-acknowledgement (ACK/NACK) signal as a response of UL transmission. A physical uplink control channel (PUCCH) carries UL control information such as HARQ ACK/NACK with respect to the DL transmission, a scheduling request (SR), and a channel quality indicator (CQI). A physical uplink shared channel (PUSCH) carries an uplink shared channel (UL-SCH).

The physical channel includes a plurality of subframes at a time domain and a plurality of subcarriers at a frequency domain. One subframe includes a plurality of symbols at the time domain. One subframe includes a plurality of resource blocks (RBs). One RB includes a plurality of symbols and a plurality of subcarriers. Further, each subframe may use specific subcarriers of specific symbols of a corresponding subframe for the PDCCH. For example, a first symbol of the subframe may be used for the PDCCH. A transmission time interval (TTI) is a unit time when the data are transmitted and may be equal to a length of one subframe.

A DL transport channel to transmit data from the network to the UE includes a broadcast channel (BCH) to transmit system information, a paging channel (PCH) to transmit a paging message, and a DL-SCH to transmit user traffic or a control signal. The system information carries at least one system information block, and all system information blocks may be transmitted with the same period. Traffic or a control signal of a multimedia broadcast/multicast service (MBMS) is transmitted through a DL-SCH or a multicast channel (MCH). A UL transport channel to transmit data from the network to the UL includes a random access channel (RACH) to transmit an initial control message and a UL-SCH to transmit the user traffic or the control signal.

An MAC layer belongs to the L2. A function of the MAC layer provides a mapping function between a plurality of logical channels and a plurality of transport channels. Further, the MAC layer performs a function of logical channel multiplexing to map a plurality of logical channels to one transport channel. The MAC layer is connected to a radio link control (RLC) being an upper layer through the logical channel. The logical channel is divided into a control channel to transport control region information and a traffic channel to transport user region information.

The logical channel is located at an upper layer of the transport channel, and is mapped to the transport channel. The logical channel includes a broadcast control channel (BCCH), a paging control channel (PCCH), a common control channel (CCCH), a multicast control channel (MCCH), and a multicast traffic channel (MTCH).

An RLC layer belongs to the L2. The RLC layer performs a function to adjust data size so that a lower layer is suitable to transmit data to a radio interval by performing segmentation and concatenation for data received from the upper layer. Further, in order to ensure various quality of service (QoS) required by a radio bearer (RB), the RLC layer provides three operation modes including a transparent mode (TM), an unacknowledged mode (UM), and an acknowledged mode (AM). An AM RLC provides a retransmission function through an automatic repeat request (ARQ) for reliable data transmission. Meanwhile, a function of the RLC layer may be implemented by an internal function block of the MAC layer. In this case, the RLC layer may not be present.

A packet data convergence protocol (PDCP) layer belongs to the L2. In order to transmit efficiently an Internet protocol (IP) packet such as IPv4 and IPv6 at a radio interval having a small bandwidth, the PDCP layer performs a header compression function to reduce a size of the IP packet header having a relatively large size and unnecessary control information. This increases a transmission efficiency of a radio interval by substantially transmitting only necessary information in a header part of data. Further, the PDCP layer performs a security function. The security function includes ciphering to prevent data interception from the third party and integrity protection to prevent a data operation of the third party.

A radio resource control (RRC) layer included in the L3 is defined in only a control plane. The RRC layer serves to control radio resources between the UE and a network. To this end, the UE and the network exchange an RRC message through the RRC layer. The RRC layer serves to control the logical channel, transport channel, and physical channel associated with configuration, re-configuration, and release of RBs. The RB signifies a logical path provided by the L1 and L2 in order to transfer data between the UE and the network. The configuration of the RB means to regulate a characteristic of a radio protocol layer and channel in order to provide a specific service and to configure detailed parameters and operation method. The RB is classified into two RBs including a signaling RB (SRB) and a data RB (DRB). The SRB is used as a path to transmit the RRC message in the control plane, and the DRB is used as a path to transmit user data in the user plane.

Basically, the cell is described as a combination of DL resources and optional UL resources, and linkage between a carrier frequency for DL resources and a carrier frequency for UL resources is specified in system information transferred through the DL resources.

Hereinafter, an RRC state and an RRC connection method of the UE is described. The RRC state represents whether the RRC layer of the UE is logically connected to an RRC layer of the E-UTRAN. When the RRC layer of the UE is logically connected to an RRC layer of the E-UTRAN, the RRC state may represent an RRC connected state (RRC_CONNECTED). When the RRC layer of the UE is not logically connected to an RRC layer of the E-UTRAN, the RRC state may represent an RRC idle state (RRC_IDLE). Since the UE in RRC_CONNECTED has the RRC connection, the E-UTRAN may recognize presence of the UE in a cell unit. Accordingly, the UE may be efficiently controlled. Meanwhile, the E-UTRAN may not recognize presence of the UE in RRC_IDLE, and the UE in RRC_IDLE is managed by a core network in a tracking area (TA) unit which is a region larger than the cell. That is, only presence of the UE in RRC_IDLE is recognized in a large region unit. In order to receive a general mobile communication service such as sound or data, the UE in RRC_IDLE should move to RRC_CONNECTED. A TA is classified by a tracking area ID (TAI). A TAI may be configured through a tracking area code (TAC) received through information broadcasted in a cell.

When the user firstly turns-on power of the UE, the UE firstly searches a suitable cell and stays in RRC_IDLE in the corresponding cell. When RRC connection is required, the UE stayed in RRC_IDLE performs RRC connection with the E-UTRAN through an RRC connection procedure and is transit to RRC_CONNECTED. The UE in RRC_IDLE needs RRC connection in various cases. For example, when UL data transmission is required due to a reason such as call try of the user or when transmission of a response message, with respect to the paging message received from the E-UTRAN, is required, the RRC connection may be needed.

Figure 4:
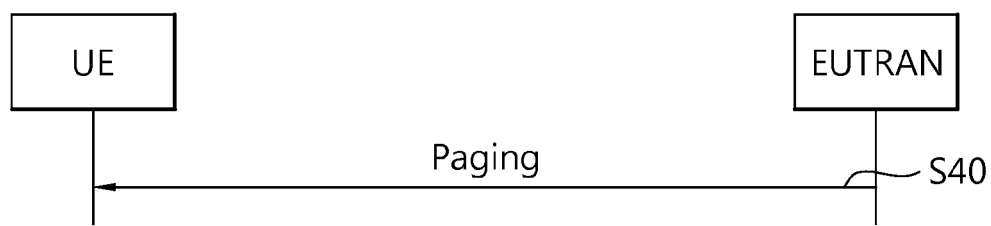
FIG. 4 shows paging message transmission.

FIG. 4 shows paging message transmission.

Referring to FIG. 4, in step S40, the E-UTRAN transmits a paging message to the UE. The paging message may be transmitted when paging information is transmitted to the UE in RRC_IDLE, when change of system information is reported to the UE in RRC_CONNECTED and RRC_IDLE, and when emergency information such as earthquake and tsunami warning system (ETWS) and commercial mobile alert system (CMAS) is reported. The paging information is provided to an upper layer. The upper layer may initiate RRC connection establishment in order to receive incoming call as a response thereto.

As described above, since a core network manages location information of the UE in RRC_IDLE in a TA unit, the core network cannot know in which cell the UE is located. Accordingly, the core network transfers a paging message to all eNBs included in a TA list of the core network. Upon receiving the paging message, the eNB broadcasts the corresponding paging page to UEs in a cell of the eNB. Upon receiving the paging message, the UE in RRC_IDLE may establish RRC connection, receive system information, or read emergency information.

Figure 5:
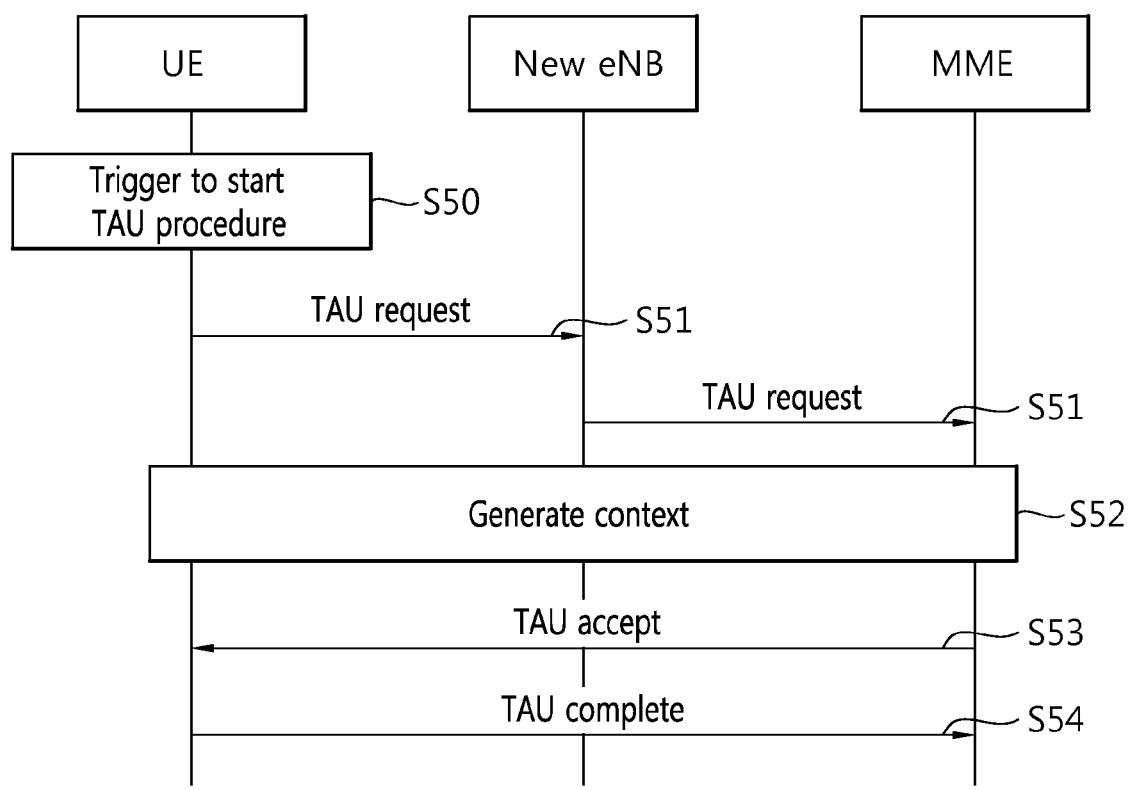
FIG. 5 shows an example of a tracking area update procedure.

FIG. 5 shows an example of a tracking area update procedure.

In order to report a current location to the core network due to a reason such as a case where the UE in RRC_IDLE is moved to another TA which is not included in a TAI list received from the core network or a case where a timer for periodically updating the TA expires, the UE in RRC_IDLE may perform a tracking area update (TAU) procedure. When the UE is moved to another TA, the UE selects (reselects) a cell and receives system information broadcast in the selected cell. The system information may include a TAC. The UE compares the TAC received through the system information with a TAI list stored in the UE. When the received TAC is included in the TAI list stored in the UE, the UE may know that there is a current TA and does not perform a TAU procedure. When the received TAC is not included in the TAI list stored in the UE, the UE may know that the UE enters a new TA. In step S50, the UE trigger initiation of the TAU procedure.

In step S51, the UE transmit a TAU request message to a new eNB, and the eNB transfers the TAU request message to the MME. In step S52, the MME receives the TAU request message so that a UE context is generated. In step S53, the MME transmits a TAU accept message to the UE. In step S54, the UE transmits a TAU complete message to the MME so that the TAU procedure is completed.

Figure 6:
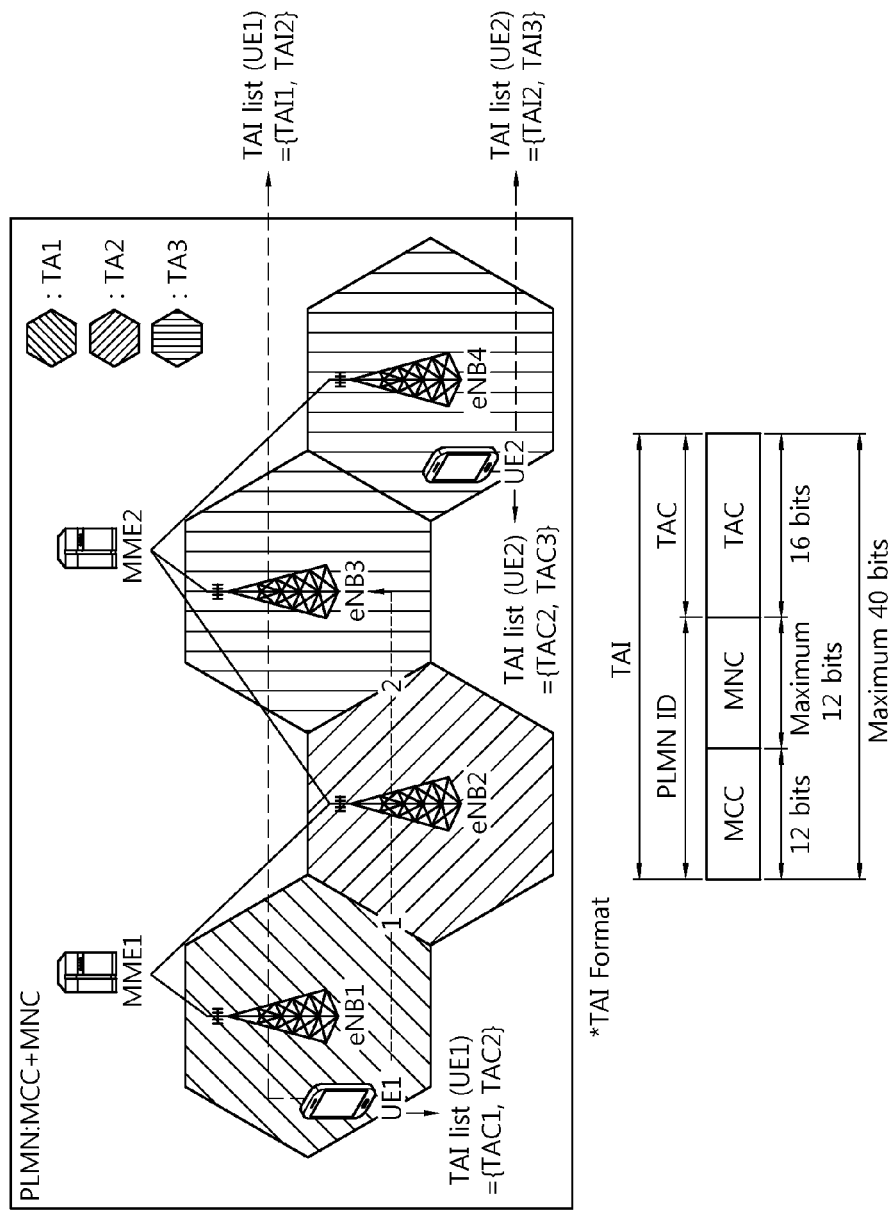
FIG. 6 shows another example of a tracking area update procedure.

FIG. 6 shows another example of a tracking area update procedure.

Referring to FIG. 6, a first UE (UE1) is located in an area of a first eNB (eNB1). The TAI list stored in the UE1 corresponds to TAI1, TAI2. The second UE (UE2) is located in an area of a fourth eNB (eNB4). The TAI list stored in the UE2 corresponds to TAI2, TAI3. The eNB1 corresponds to TA1, the second eNB (eNB2) corresponds to TA2, and the third eNB (eNB3) and the eNB4 correspond to TA3. There is interface between the eNB 1 and the eNB2 providing TA1 and TA2 and the first MME (MME1). There is interface between the eNB2 to the eNB4 providing TA2 and TA3 and the second MME (MME2).

The UE may perform a TAU procedure based on a TAI list acquired through an attach procedure. The UE compares the TAI transmitted through system information by the eNB with a TAI list stored in the UE. Referring to FIG. 6, the UE1 may know that the TAI transmitted from the eNB1 is the TA1. Since this is a TAI included in the TAI list of the UE1, the UE does not perform the TAU procedure. This is similar to a case where the UE1 moves to a cell provided from the eNB2. However, when the UE1 moves to a cell provided from the eNB3, the UE1 may know that the TAI transmitted from the eNB3 is TA3. Since this is not a TAI included in the TAI list of the UE1, the UE1 should perform the TAU procedure.

The TAI includes an ID of a public land mobile network (PLMN) to which a TA belongs and a TAC of the TA. The PLMN ID includes a mobile country code (MCC) of 12 bits and a mobile network code (MNC) of maximum 12 bits. The TAC has a length of 16 bits. Accordingly, the TAI may have a length of maximum 40 bits.

As a next fifth generation mobile communication system is discussed, it is expected that a great number of small cells may be concentrated and deployed. When the great number of small cells is deployed, an important consideration is to control user-centered connectivity. In order to control the user-centered connectivity, a new type radio access network such as a cloud RAN including a baseband unit (BBU) and a remote radio frequency (RF) unit (RRU) which are configured separately from each other may be introduced. The BBU is a unit for processing a mobile communication system, and is in charge of communication through physical interface. The RRU is connected to the BBU and is in charge of transmission and/or reception of signals. An existing radio access network includes a mobile communication system based on an eNB including the BBU and the RRU which are coupled with each other. On the other hand, it is assumed that the cloud RAN basically includes the BBU and the RRU which are separated from each other. That is, a plurality of BBUs may be located at one physical point regardless of a location of the user. A plurality of RRUs may be located close to the user to transmit or receive the signals. As time goes by, a plurality of BBUs may be mapped to a plurality of RRUs in various schemes to provide a service to the user. One RRU may be mapped to only one BBU. Alternatively, one RRU may be mapped to a plurality of BBUs. In the same manner, one BBU may be mapped to only one RRU. Alternatively, one BBU may be mapped to a plurality of RRUs.

As the cloud RAN is introduced, it is expected that concept of user association based on physical cell, which is currently defined, disappears and an important consideration will be concept of user association based on user centered coverage. That is, according to the related art, a physical cell is present so that users access a cell to receive a service. On the other hand, hereafter, a network may configure coverage capable of providing an optimal communication environment in a user unit, and provide a service base on corresponding coverage by escaping from the existing cell concept. For user-centered coverage based communication, there is a need for a radio access being an intelligent situation capable of substantially providing optimal connectivity to the user by taking into consideration a variable environment around the user and a variable environment of the network. In addition, when a shared antenna system (SAS) RRU is considered, RRUs may be deployed to change a mapping relation according to the time, there may be a need for an efficient paging method for a user in an idle state in the above environment. That is, since processing of the paging message may be changed according to how to configure the TA, the consideration may be required.

Figure 7:
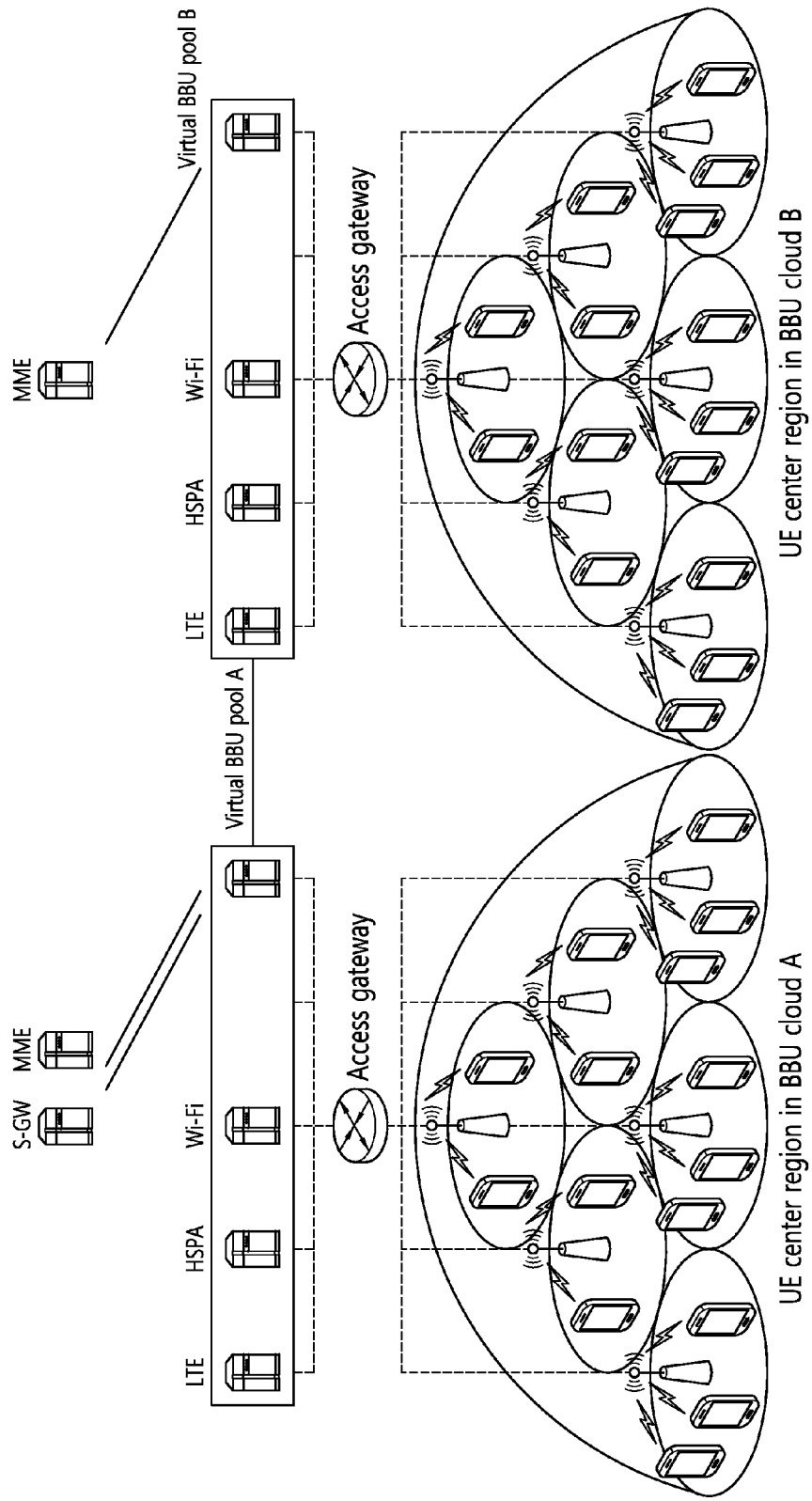
FIG. 7 shows an example of a configuration of a cloud RAN according to an embodiment of the present invention.

FIG. 7 shows an example of a configuration of a cloud RAN according to an embodiment of the present invention.

The cloud RAN may include at least one virtual BBU pool. Referring to FIG. 7, the cloud RAN includes a virtual BBU pool A and a virtual BBU B. Each virtual BBU pool may include at least one BBU. BBUs in the virtual BBU pool may include BBUs supporting different radio access technologies (RAT). Referring to FIG. 7, the virtual BBU pool A and the virtual BBU B include an LTE BBU, a high speed packet access (HSPA) BBU, and a Wi-Fi BBU. Each BBU pool is connected to an MME and/or an S-GW. The virtual BBU pools may be connected to each other through X2 interface or other interface.

BBUs in the virtual BBU pool are mapped to SAS RRUs supporting multi RATs through an access gateway. The RRU is controlled by the mapped BBU. Each RRU may simply be a physical antenna. L1/L2/L3 layer processing is performed by BBUs in the virtual BBU pool. One RRU may be mapped to at least one BBU at a specific time. According to a situation of the BBU (for example, load, resource use situation, etc), the mapped BBU may be changed according to time. The BBU mapped to the RRU may be changed in the virtual BBU pool. It is assumed that mapping between BBUs and RRUs in the virtual BBU pool corresponds to an ideal backhaul. All RRUs in the same virtual BBU pool may have the same virtual cell ID. A synchronization signal used to acquire DL synchronization is transmitted by each RRU. The synchronization signal may include a virtual cell ID indicating the virtual BBU pool including the RRUs and/or an RRU ID capable of identifying each RRU.

When a service is provided the user in a unit of the virtual BBU pool according to a configuration of the cloud RAN shown in FIG. 7, the user may detect RRUs where a downlink signal satisfies quality of a predetermined level or greater and may access a RRU mapped to a BBU of the best situation (load, resource use situation, etc) among BBUs mapped to corresponding RRUs.

Meanwhile, when UL data transmitted to the network from the user in a form of a buffer status report (BSR) or DL data transmitted to the user from the network is generated, since an amount of resources necessary to transmit the DL data is generally greater than an amount of resources necessary to transmit the UL data, it may be assumed that there is a DL connectivity greater than the UL connectivity in the user-centered connectivity. Assuming that the UL connectivity of the user is user-centered UL coverage and the DL connectivity is user-centered DL coverage, the user-centered coverage may be defined by a sum of asymmetrical user-centered UL coverage and the user-centered DL coverage. The user-centered coverage is configured to provide an optical service to a corresponding user by determining BBU-RRU pairs capable of providing optimal connectivity to the user in the cloud RAN environment. To this end, it is assumed that the user has information on BBUs and RRUs corresponding to the DL coverage and the UL coverage.

As described in FIG. 7, at least one BBU is included in one virtual BBU pool, and each BBU controls at least one RRU. In this case, the at least one RRU mapped to one BBU may not be geometrically close to each other. When a plurality of RRUs mapped to one BBU are arranged not to be geometrically close to each other, it is difficult to apply the existing paging transmission method for transmitting the paging message by an eNB of all cells included in the TA. Since the BBU may be mapped regardless of a geometrical location of RRUs in the cloud RAN, it is difficult to configure a TA in a unit of the BBU. That is, it is difficult to apply the existing TA concept to the cloud RAN. Further, although the TA in the unit of the BBU is configured, transmission of a paging message from all RRUs mapped to all BBUs in the virtual BBU pool may cause significant signaling overhead.

Accordingly, there is a need for a new method for transmitting a paging message suitable for the cloud RAN environment. According to an embodiment of the present invention, a method for transmitting a hierarchical paging message, according to trace of a UE such as moving speed and a moving direction of the UE, may be proposed.

Figure 8:
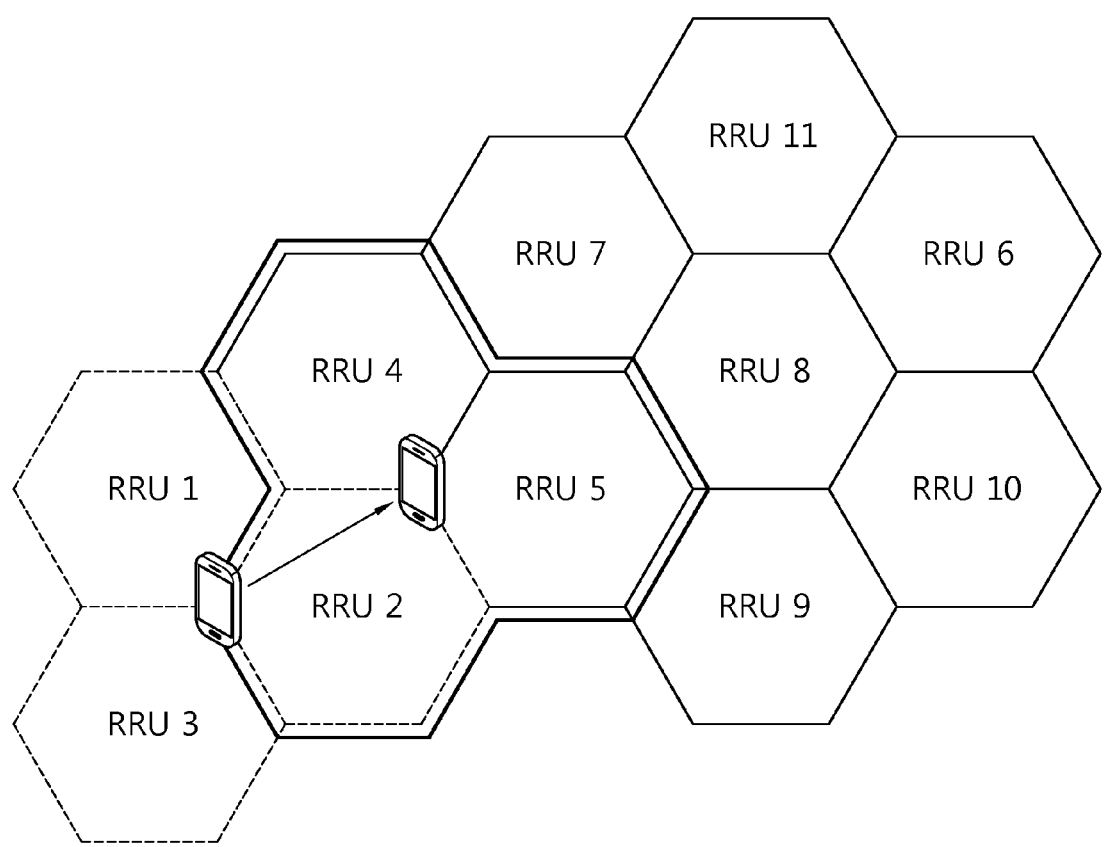
FIG. 8 shows an example of trace of a UE in a cloud RAN environment according to an embodiment of the present invention.

FIG. 8 shows an example of trace of a UE in a cloud RAN environment according to an embodiment of the present invention.

Trace of the UE in RRC_CONNECTED may be expressed through coverage of the UE. The coverage of the UE may be a set of accessible RRUs of the UE. The UE may recognize the set of accessible RRUs based on a UE-specific RRU list and a synchronization signal transmitted from the RRUs. Referring to FIG. 8, since accessible PRUs of the UE include RRU 1, RRU 2, and RRU 3 before the UE moves, the coverage may be first UE coverage. Since accessible PRUs of the UE include RRU 2, RRU 4, and RRU 5 after the UE moves, the coverage may be second UE coverage. BBUs mapped to the RRUs and MME may estimate and/or update moving speed and moving direction of the UE through coverage and trace of the corresponding UE. That is, the BBU and/or the MME may receive a measurement report including variation of signal strength with respect to each RRU measured by the UE to estimate a moving direction of the corresponding UE. Further, the BBU and/or the MME may estimate moving speed of the corresponding UE through a moving distance per time (e.g., unit: second).

Figure 9:
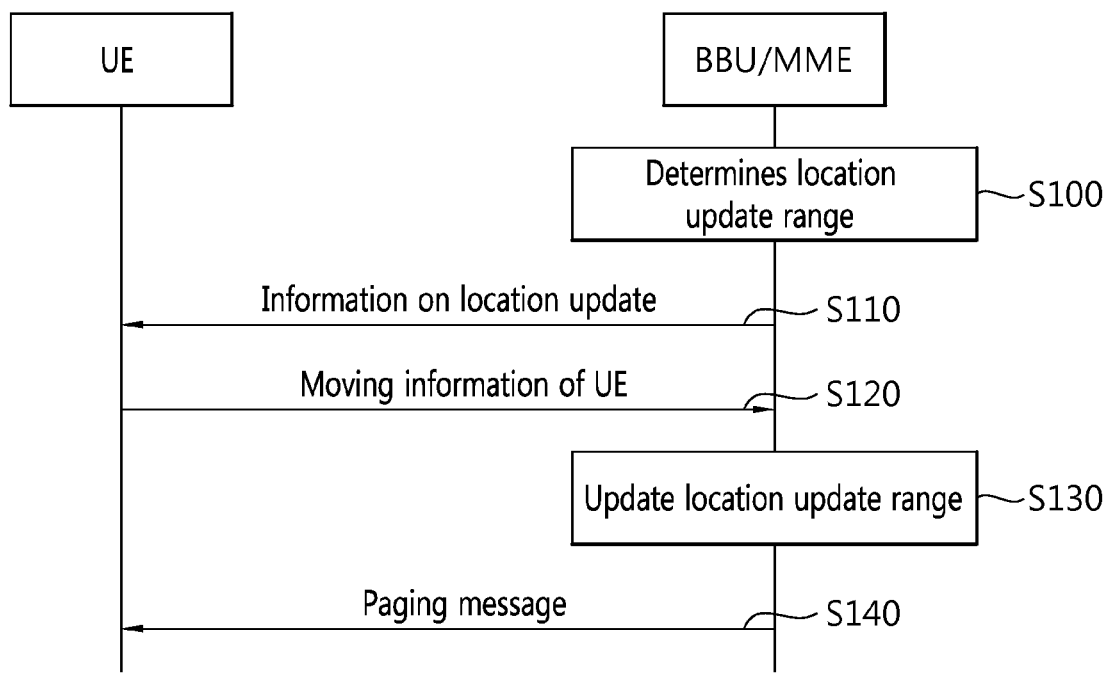
FIG. 9 shows an example of a method for transmitting a paging message according to an embodiment of the present invention.

FIG. 9 shows an example of a method for transmitting a paging message according to an embodiment of the present invention.

In step S100, BBU/MME determines a location update range. It is assumed that the BBU/MME previously estimates the moving direction and/or the moving speed of the UE based on the measurement report received from the UE. When the UE is changed to an idle mode, the BBU/MME determines a location update range using the estimated moving direction and/or moving speed. The location update range may be determined by the following Equation 1.

$$\text{Location update range} = \text{RRU list}[(\text{the number of RRUs according to UE coverage}) \times \alpha, \text{moving direction}] \quad \text{<Equation 1>}$$

In Equation 1, $\alpha$ may be one real number according to moving speed of the corresponding UE. Further, $\alpha$ is determined by the network, and is proportional to the moving speed of the UE. That is, $\alpha$ may be increased according to increase of the moving speed of the UE.

Referring to Equation 1, the location update range may be determined by taking into consideration the coverage, the moving speed, and the moving direction of the UE. For example, referring to the configuration of the cloud RAN and the trace of the UE described in FIG. 8, it is assumed that current coverage of the UE includes RRU 2, RRU 4, and RRU 5, and the UE moves in a direction of two o'clock. Assuming that $\alpha=2$ corresponding to the moving speed of the UE, 6 RRUs (=3(the number of RRUs according to coverage of the UE)×2) may be determined as the location update range.

When considering the moving direction (two o'clock), total 6 RRUs including RRU 5, RRU 6, RRU 7, RRU 8, RRU 10, and RRU 11 may be determined as the location update range.

The location update range may be determined by the following Equation 2.

Location update range=RRU list[(the number of RRUs according to UE coverage)×α,moving direction]+UE coverage  <Equation 2>

That is, the current coverage of the UE may be determined as the location update range together with the location update range determined by Equation 1. That is, referring to the configuration of the cloud RAN and the trace of the UE described in FIG. 8, total 8 RRUs including RRU 2 and RRU 4 in addition to RRU 5, RRU 6, RRU 7, RRU 8, RRU 10, and RRU 11 may be determined as the location update range.

Back to FIG. 9, in step S110, BBU/MME transmits information on the determined location update range to the UE. The information on the location update range transmitted from the BBU/MME may include at least one of a location update range, a tolerance limit (=range_tolerance limits) with respect to a corresponding location update range, a tolerance limit (=speed_tolerance limits) with respect to the moving speed of the UE, a measuring period of moving information of the UE, and an update period of the location update range. When the BBU/MME transmits the information on the location update range to the UE, an update timer starts. As described later, whenever the location update range is updated, the update timer may restart. The UE may enter a sleep mode in order to minimize power consumption.

In step S120, the UE transmits moving information thereof to the BBU/MME. The UE in the idle mode autonomously measures signal strength with respect to RRUs according to a measuring period of the moving information. When at least one of following conditions is satisfied according to the measurement result, the UE reports the measurement result and/or the moving information to the BBU/MME.

When the number of RRUs which are not included in the location update range is equal to or greater than range-tolerance limits (or when the number of RRUs included in the location update range is equal to or greater than range-tolerance limits): For example, when the UE moves to a direction different from a moving direction which the BBU/MME knows, the number of RRUs which are not included in the location update range may exceed the range-tolerance limits. In this case, update of the location update range is required.

When the moving speed of the UE is equal to or greater than speed-tolerance limits: When the UE moves faster than the moving speed of the UE which the BBU/MME knows, update of the location update range is required.

Update timer expires: Although the moving speed and/or moving direction of the UE are not greatly changed, update of the location update range is required for every specific period.

For example, referring to the configuration of the cloud RAN and the trace of the UE described in FIG. 8, it is assumed that a current location update range is RRU 1, RRU 2, and RRU 3, range-tolerance is 2 and the UE moves as shown in FIG. 8. It may be confirmed that the accessible RRUs are RRU 2, RRU 4 and RRU 5 after the UE moves. In this case, since the number of RRUs which are not included in the location update range is 2 (RRU 4 and RRU 5) and the range-tolerance is 2, the UE should update the location update range.

Back to FIG. 9, in step S130, the BBU/MME updates the location update range based on a measurement result with respect to RRUs and/or moving information of the UE, received from the UE. The BBU/MME transmits information on the updated location update range to the UE. The information on the updated update range includes at least one of the updated range, a tolerance limit (range_tolerance limits) with respect to the updated location update range, tolerance limit (=speed_tolerance limits) with respect to the moving speed of the UE, a measurement period of the moving speed of the UE, and an update period of the location update range. The UE may enter an idle mode in order to minimize power consumption.

In step S140, the BBU/MME transmits the paging message to the UE. The MME may transmit a paging message to the UE through at least one RRU included in the newest location update range. That is, the MME transmits a RRU list to the BBU pool controller together with information of UE to be paged. In this case, if the BBU pool controller can acquire information on the location update range of each UE, the RRU list may not be transmitted. At least one BBU mapped to an RRU included in the corresponding RRU list may configure the paging message based on information on at least one paging UE to transmit the configured paging message to at least one mapped RRU. The RRU transfers the paging message the UE.

Alternatively, when the BBU/MME does not receive a response to the paging message transmitted to the UE, the BBU/MME may request retransmission of the paging message to the BBU pool by extending the transmission range of the paging message based on a current location update range. That is, as described in FIG. 9, the BBU/MME does not update the location update range based on the measurement result with respect to the RRUs and/or moving information of the UE, received from the UE, but may update the location update range in such a way that the location update range is extended when a response of the paging message transmitted to the UE is not received.

Meanwhile, since it is assumed that different cell IDs are allocated to each virtual BBU pool in the above description, the UE should additionally report to the network that a location thereof is changed when the UE recognizes a RRU having a different cell ID. In this case, the UE may report the measurement result and/or moving information thereof to the BBU/MME. The BBU/MME updates the location update range based on the measurement result with respect to RRUs and/or moving speed of the UE, receive from the UE. The BBU/MME transmits information on the updated location update range. Information on the updated location update range may include at least one of the updated location update range, a tolerance limit (=range_tolerance limits) with respect to the updated location update range, a tolerance limit (=speed_tolerance limits) with respect to the moving speed of the UE, a measuring period of moving information of the UE, and an update period of the location update range. The UE may enter an idle mode in order to minimize power consumption.

Figure 10:
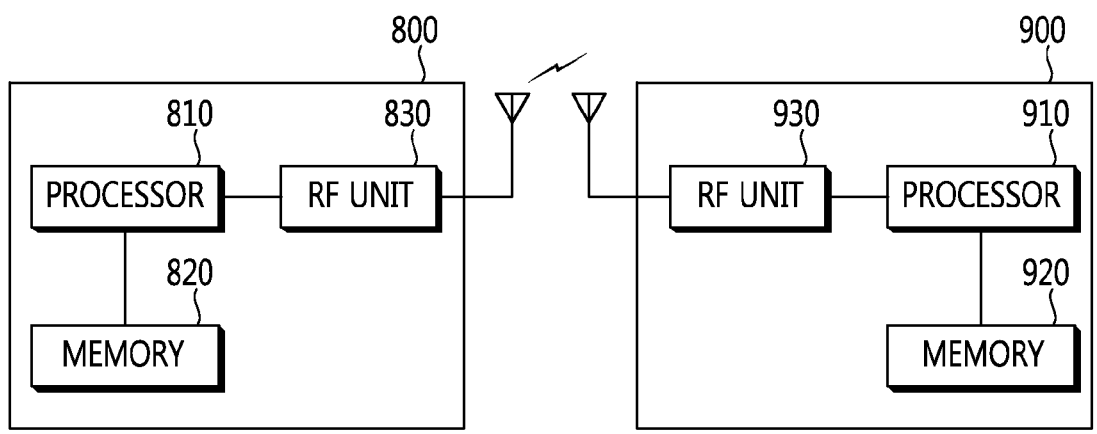
FIG. 10 shows a wireless communication system to implement an embodiment of the present invention.

FIG. 10 shows a wireless communication system to implement an embodiment of the present invention.

A BBU/MME 800 includes a processor 810, a memory 820, and a radio frequency (RF) unit 830. The processor 810 may be configured to implement proposed functions, procedures, and/or methods in this description. Layers of the radio interface protocol may be implemented in the processor 810. The memory 820 is operatively coupled with the processor 810 and stores a variety of information to operate the processor 810. The RF unit 830 is operatively coupled with the processor 810, and transmits and/or receives a radio signal.

Or, the RF unit 830 may be an RRU which is connected to the BBU 800 and apart from the BBU 800 geographically.

A UE 900 includes a processor 910, a memory 920 and an RF unit 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The RF unit 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The RF units 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

According to the present invention, the paging message may be efficiently transmitted in the cloud RAN environment.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What is claimed is:

1. A method for receiving, by user equipment (UE), a paging message in a cloud radio access network (RAN) system, the method comprising:
   receiving information on a location update range of a UE, which is determined based on moving speed and a moving direction of the UE, from a baseband unit (BBU) or a mobility management entity (MME);
   transmitting information on moving information of the UE, which is determined based on the received information on the location update range and a measurement result with respect to at least one accessible remote radio frequency (RF) unit (RRU) of the UE, and the measurement result to the BBU or the MME; and
   receiving a paging message from the MME through at least one RRU included in an updated location update range, which is determined based on the transmitted measurement result and the moving information of the UE,
   wherein the cloud RAN system comprises at least one virtual BBU pool,
   wherein the at least one virtual BBU pool includes a plurality of BBUs to perform hierarchical process and a plurality of RRUs to transmit or receive a radio signal, and
   wherein one RRUs is mapped to at least one BBU through an access gateway and is controlled by the at least one BBU.

2. The method of claim 1, wherein information on the location update range of the UE includes at least one of the location update range, a tolerance limit with respect to the location update range, a tolerance limit with respect to the moving speed of the UE, a measuring period of the moving information of the UE, and an update period of the location update range.

3. The method of claim 2, wherein the moving information of the UE and the measurement result are transmitted when the number of RRUs which are not included in the location update of the UE exceeds the tolerance limit with respect to the location update range, when the moving speed of the UE exceeds the tolerance limit with respect to the moving speed of the UE, or when an update timer expires.

4. The method of claim 1, wherein an update timer starts when the moving information of the UE is received.

5. The method of claim 1, wherein the measurement result with respect to the at least one accessible RRU of the UE is measured based on a synchronization signal transmitted from the at least one RRU.

6. The method of claim 5, wherein the synchronization signal includes a virtual cell identifier (ID) of a virtual BBU pool including the at least one RRU and an ID of the at least one RRU.

7. The method of claim 1, wherein the RRUs included in the at least one virtual BBU pool has an identical virtual cell ID.

8. A method for transmitting, by a baseband unit (BBU) or a mobility management entity (MME), a paging message in a cloud radio access network (RAN) system, the method comprising:
   determining a location update range of a user equipment (UE) based on moving speed and a moving direction of the UE;
   transmitting information on the location update range of the UE to the UE;
   receiving information on moving information of the UE, which is determined by the UE based on the transmitted information on the location update range and a measurement result with respect to at least one accessible remote radio frequency (RF) unit (RRU) of the UE, and the measurement result from the UE;
   updating the location update range of the UE based on the received measurement result and the moving information of the UE; and
   transmitting a paging message to the UE through at least one RRU included in the updated location update range of the UE,
   wherein the cloud RAN system comprises at least one virtual BBU pool,
   wherein the at least one virtual BBU pool includes a plurality of BBUs to perform hierarchical process and a plurality of RRUs to transmit or receive a radio signal, and
   wherein one RRUs is mapped to at least one BBU through an access gateway and is controlled by the at least one BBU.

9. The method of claim 8, wherein the location update range of the UE is determined as the number of RRUs determined based on coverage of the UE and a real number $\alpha$ corresponding to the moving speed of the UE by taking into consideration a moving direction of the UE.

10. The method of claim 9, wherein the real number $\alpha$ is determined by a network.

11. The method of claim 9, wherein the real number $\alpha$ is proportional to the moving speed of the UE.

12. The method of claim 8, wherein the location update range of the UE is determined when the UE is changed to an idle mode.

13. The method of claim 8, wherein information on the location update range of the UE includes at least one of the location update range, a tolerance limit with respect to the location update range, a tolerance limit with respect to the moving speed of the UE, a measuring period of the moving information of the UE, and an update period of the location update range.

14. The method of claim 8, further transmitting:
information on the updated location update range to the UE.

\* \* \* \* \*